(12) United States Patent
Beri et al.

(10) Patent No.: US 12,243,135 B2
(45) Date of Patent: Mar. 4, 2025

(54) VECTOR OBJECT BLENDING

(71) Applicant: Adobe Inc., San Jose, CA (US)

(72) Inventors: Tarun Beri, Noida (IN); Matthew David Fisher, Burlingame, CA (US)

(73) Assignee: Adobe Inc., San Jose, CA (US)

( * ) Notice: Subject to any disclaimer, the term of this patent is extended or adjusted under 35 U.S.C. 154(b) by 50 days.

(21) Appl. No.: 17/980,881

(22) Filed: Nov. 4, 2022

(65) Prior Publication Data
US 2024/0153177 A1    May 9, 2024

(51) Int. Cl.
*G06T 11/60* (2006.01)
(52) U.S. Cl.
CPC .......... *G06T 11/60* (2013.01); *G06T 2210/44* (2013.01)
(58) Field of Classification Search
CPC ............................. G06T 11/60; G06T 2210/44
USPC ................................................... 345/646, 633
See application file for complete search history.

(56) References Cited

U.S. PATENT DOCUMENTS

| | | | | |
|---|---|---|---|---|
| 5,325,475 A * | 6/1994 | Poggio | ................. | G06V 10/757 345/475 |
| 5,854,634 A | 12/1998 | Kroitor | | |
| 6,111,588 A | 8/2000 | Newell | | |
| 6,911,980 B1 | 6/2005 | Newell et al. | | |
| 11,769,281 B2 | 9/2023 | Beri et al. | | |
| 2008/0100805 A1 * | 5/2008 | Majumder | ............ | G06F 3/1446 353/30 |
| 2014/0085311 A1 | 3/2014 | Gay et al. | | |
| 2016/0019415 A1 * | 1/2016 | Ra | .............................. | G06T 7/73 382/197 |
| 2016/0373312 A1 * | 12/2016 | El-Nasr | ................... | A63F 13/20 |
| 2022/0172433 A1 * | 6/2022 | Ricard | ...................... | G06T 9/20 |
| 2023/0117787 A1 * | 4/2023 | Wu | ........................ | G06T 19/20 345/419 |
| 2023/0245356 A1 | 8/2023 | Beri et al. | | |

OTHER PUBLICATIONS

U.S. Appl. No. 17/590,255, "Non-Final Office Action", U.S. Appl. No. 17/590,255, filed May 2, 2023, 33 pages.

(Continued)

*Primary Examiner* — Hai Tao Sun
(74) *Attorney, Agent, or Firm* — FIG. 1 Patents

(57) ABSTRACT

Techniques for vector object blending are described to generate a transformed vector object based on a first vector object and a second vector object. A transformation module, for instance, receives a first vector object that includes a plurality of first paths and a second vector object that includes a plurality of second paths. The transformation module computes morphing costs based on a correspondence within candidate path pairs that include one of the first paths and one of the second paths. Based on the morphing costs, the transformation module generates a low-cost mapping of paths between the first paths and the second paths. To generate the transformed vector object, the transformation module adjusts one or more properties of at least one of the first paths based on the mapping, such as geometry, appearance, and z-order.

20 Claims, 12 Drawing Sheets
(8 of 12 Drawing Sheet(s) Filed in Color)

(56) References Cited

OTHER PUBLICATIONS

Al-Khaffaf, Hasan S.M., et al., "A Framework for Objective Performance Evaluation for Digital Font Reconstruction", 2016 SAI Computing Conference (SAI) [retrieved Sep. 11, 2022]. Retrieved from the Internet <https://doi.org/10.1109/SAI.2016.7556008>, Aug. 18, 2022, 4 pages.
U.S. Appl. No. 17/590,255, "Notice of Allowance", U.S. Appl. No. 17/590,255, filed Aug. 11, 2023, 8 pages.
"DALL.E 2", OpenAI [retrieved Oct. 19, 2022]. Retrieved from the Internet <https://openai.com/dall-e-2/>., Jan. 5, 2021, 13 Pages.
Adobe Creative Cloud, "Transform Artwork Freely in Illustrator Using Puppet Warp | Adobe Creative Cloud", YouTube Video uploaded by Adobe Creative Cloud [online][retrieved Aug. 26, 2022]. Retrieved from the Internet <https://www.youtube.com/watch?v=eAsqRJA9n0E>., Aug. 14, 2018, 4 Pages.
Autodesk, "Morph deformer", Autodesk Inc. [retrieved Aug. 26, 2022]. Retrieved from the Internet <https://knowledge.autodesk.com/support/maya/learn-explore/caas/CloudHelp/cloudhelp/2022/ENU/Maya-CharacterAnimation/files/GUID-EFDD514A-10FF-44A2-BC93-0F53DB5ABA19-htm.html>., Dec. 6, 2021, 6 Pages.
Beri, Tarun, et al., "US Application as Filed", U.S. Appl. No. 17/590,255, filed Feb. 1, 2022, 65 pages.
CG Shortcuts, "Object Morphing—Cinema 4D Tutorial (Free Project)", YouTube Video uploaded by CG Shortcuts [online][retrieved Aug. 26, 2022]. Retrieved from the Internet <https://www.youtube.com/watch?v=ZYoCydK5-WM>., Jan. 7, 2022, 4 Pages.
Kuhn, Harold W, "The Hungarian method for the assignment problem", Naval Research Logistics Quarterly, vol. 2, No. 1-2 [retrieved Aug. 26, 2022]. Retrieved from the internet <https://web.archive.org/web/20140211034126id_/http://tom.host.cs.st-andrews.ac.uk:80/CS3052-CC/Practicals/Kuhn.pdf>., Mar. 1955, 19 Pages.
Liu, Ying-Tian, et al., "Learning Implicit Glyph Shape Representation", arXiv [retrieved Nov. 16, 2021]. Retrieved from the internet <https://arxiv.org/pdf/2106.08573.pdf>., Jun. 2021, 9 Pages.
Müller, Meinard, "Dynamic time warping", In: Information Retrieval for Music and Motion. Springer, Berlin, Heidelberg [retrieved Aug. 26, 2022]. Retrieved from the Internet <https://www.researchgate.net/publication/285279006_Dynamic_time_warping>., Jan. 2007, 17 Pages.
Ramesh, Aditya, et al., "Hierarchical Text-Conditional Image Generation with CLIP Latents", Cornell University arXiv, arXiv.org [retrieved Oct. 19, 2022]. Retrieved from the Internet <https://arxiv.org/pdf/2204.06125.pdf>., Apr. 13, 2022, 27 Pages.
Ross, Amy, "Procrustes analysis", Department of Computer Science and Engineering University of South Carolina [retrieved Aug. 26, 2022]. Retrieved from the Internet <https://citeseerx.ist.psu.edu/viewdoc/download?doi=10.1.1.119.2686&rep=rep1&type=pdf>., 8 Pages.
Smirnov, Dmitriy, et al., "Deep Parametric Shape Predictions using Distance Fields", arXiv Preprint, Cornell University, arXiv.org [retrieved Nov. 16, 201]. Retrieved from the Internet <https://arxiv.org/pdf/1904.08921.pdf>., Mar. 19, 2020, 14 pages.
STORMZ, "Morph Objects into Other Objects in Houdini", YouTube Video uploaded by Stormz [online][retrieved Aug. 26, 2022]. Retrieved from the Internet <https://www.youtube.com/watch?v=8LsI2ARFv04>., Nov. 10, 2020, 4 Pages.
Wang, Yizhi, et al., "Attribute2Font: creating fonts you want from attributes", ACM Transactions on Graphics, vol. 39, No. 4 [retrieved Nov. 16, 2021] Retrieved from the Internet <https://www.researchgate.net/publication/341423467_Attribute2Font_Creating_Fonts_You_Want_From_Attributes>., Jun. 2020, 15 Pages.
Xi, Yankun, et al., "JointFontGAN: Joint Geometry-Content GAN for Font Generation via Few-Shot Learning", MM 20: Proceedings of the 28th ACM International Conference on Multimedia [retrieved Nov. 16, 2021]. Retrieved from the Internet <https://par.nsf.gov/servlets/purl/10199594>., Oct. 12, 2020, 9 Pages.

\* cited by examiner

VECTOR OBJECT BLENDING

BACKGROUND

Vector objects are mathematically defined using paths, rather than as a collection of pixels. This enables vector objects to be scaled and modified by a computing device without a loss in visual quality. Additionally, a vector object is generally rendered using an amount of data which is only a fraction of an amount of data required to render a raster object that is visually similar to the vector object. As such, vector objects are employed for a variety of purposes, e.g., in online applications.

However, producing new vector objects with professional quality is tedious and time-consuming, and requires extensive technical design skills. Conventional approaches for generating new vector objects based on existing vector objects, e.g., image morphing, are limited. For instance, manual generation of morphed vector objects, e.g., by a user, is time consuming and is often limited by the expertise of the user. Conventional methods for image morphing are also limited, such as raster-based morphing or mesh-based morphing, which produce graphics that are not mathematically defined and thus offset the benefits associated with vector objects.

SUMMARY

Techniques and systems for vector object blending are described. In an example, a computing device implements a content processing system to receive input data that describes a first vector object that includes a plurality of first paths and a second vector object that includes a plurality of second paths. The content processing system computes morphing costs that measure a cost to match a particular first path to a particular second path. To do so, the content processing system determines a correspondence within candidate path pairs that include a first path and a second path.

Based on the morphing costs, the content processing system generates a low-cost mapping of paths between the first paths and the second paths. To generate the transformed vector object, the content processing system adjusts one or more properties of at least one of the first paths based on the mapping, such as geometry, appearance, and/or z-order. In this way, the techniques described herein enable generation of a transformed vector object that is based on visual characteristics of the first vector object and the second vector object.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
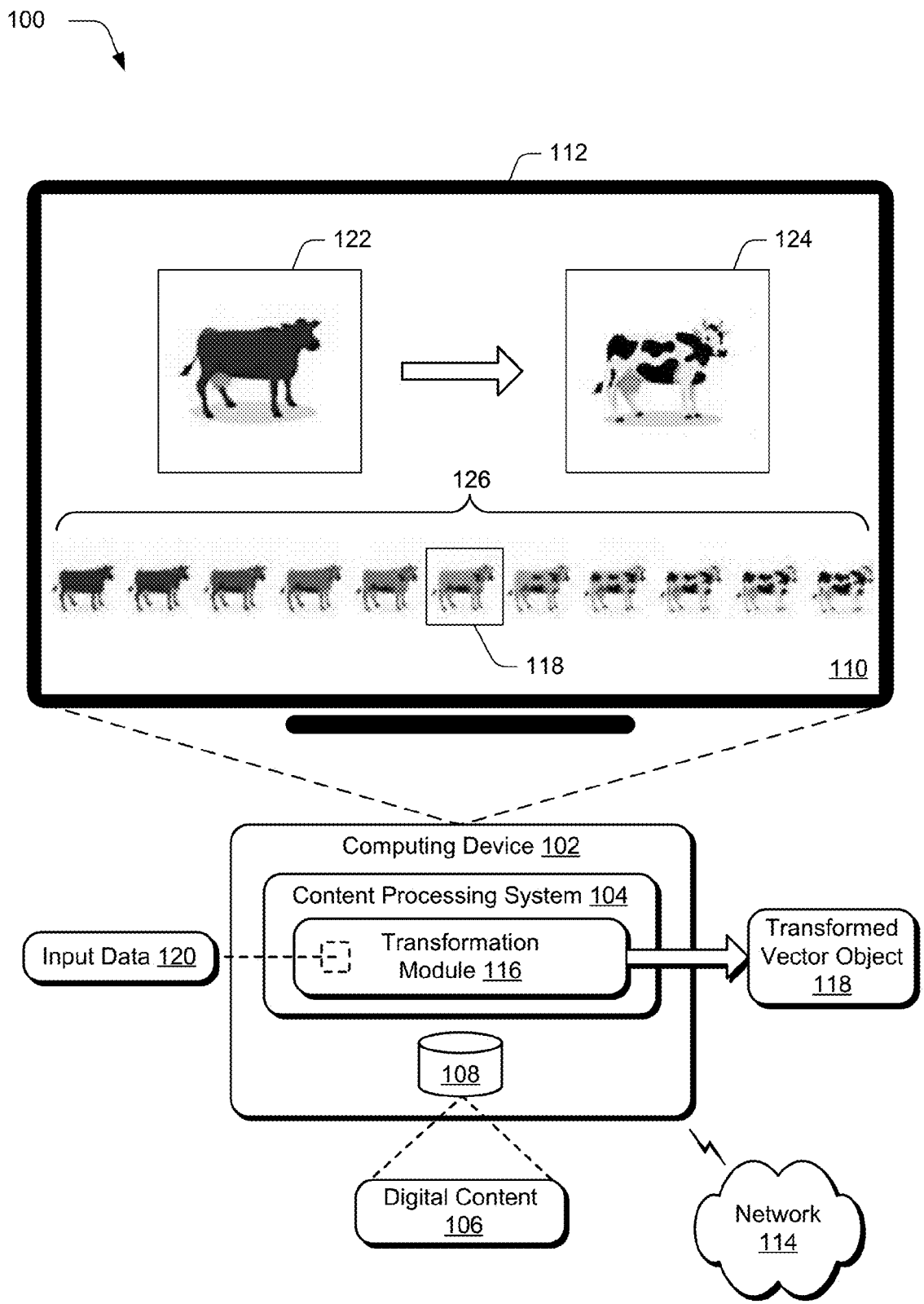
FIG. 1 is an illustration of an environment in an example implementation that is operable to employ vector object blending techniques as described herein.

Content processing systems are often tasked with imparting a unique style and customizations to vector objects included as part of digital content. The vector objects are defined mathematically (e.g., as a collection of Bezier curves) to include paths that are rendered for output, e.g., for display in a user interface, onto a physical medium, and so forth. In this way, vector objects are scalable without a loss in visual quality.

When editing vector objects, in some instances it is desirable to impart visual qualities from one vector object to another vector object, e.g., vector object morphing. However, conventional techniques to support such customizations are limited and challenging. For instance, conventional mesh based and/or raster based morphing techniques lose the underlying mathematical structure and cause these edits to forgo the advantages made possible by vector objects involving discrete path definition and arrangement. Further, conventional vector morphing techniques are constrained based on an initial arrangement of paths and thus have limited applications.

Accordingly, techniques and systems for vector object blending are described that overcome these challenges and limitations to generate customized vector objects by generating a transformed vector object based on visual characteristics of a source vector object and a target vector object (or multiple target vector objects). In this way, the techniques described herein enable the source vector object and the target vector object to be "blended together" to produce transformed vector objects that represent realistic intermediates with visual properties of both the source vector object and the target vector object.

In an example, a computing device implements a transformation system to receive input data describing a first vector object, e.g., a source vector object, and a second vector object, e.g., a target vector object. The first vector object includes a plurality of first paths, and the second vector object includes a plurality of second paths. In various examples, the first paths and/or the second paths include one or more path groups, e.g., simple groups that organize the paths to structure the first or second vector object, or complex groups such as compound paths and/or clipping groups. The complex groups, for instance, impart specific functionality and define visual effects for the vector objects.

In some examples, the transformation system is operable to generate blendable hierarchies from the first vector object and the second vector object. Generally, the blendable hierarchies organize paths of a same path group (e.g., simple groups, clipping groups, compound paths, etc.) such that path groups from the first vector object are matchable with alike path groups from the second vector object. The transformation system is thus operable to match paths of simple groups from the first vector object with paths of simple groups from the second vector object, and paths of complex groups from the first vector object with paths of complex groups from the second vector object such that the paths are blendable in accordance with the techniques described below. In this way, the transformation system ensures that the complex groups retain their underlying functionality and/or visual effects in a subsequently generated transformed vector object.

In order to generate a transformed vector object that includes visual features of both the first vector object and the second vector object, the transformation system is employed to generate path pairs that include one of the first paths and one of the second paths. Path pairs with a high level of correspondence between the first path and the second path have a low cost, while path pairs with a low level of correspondence have a high cost. High-cost path pairs have a propensity to cause visual artifacts in a subsequently generated transformed vector object.

Accordingly, the transformation system is operable to compute morphing costs based on a correspondence within a plurality of candidate path pairs. A candidate path pair includes one of the first paths and one of the second paths, and in an example, candidate path pairs are generated for each possible combination of path pairs between the first paths and the second paths. In some implementations, the morphing costs quantify a variety of correspondences within a candidate path pair, such as one or more of a spatial displacement, a volumetric proximity, and/or a geometric concurrence. Thus, morphing costs include one or more of a spatial cost, a volumetric cost, and/or a geometric cost that describe such correspondences.

Based on the morphing costs, the transformation system is operable to generate a mapping of paths between the plurality of first paths and the plurality of second paths. Generally, the mapping of paths represents a plurality of path pairs that minimizes the overall morphing costs, and thus improves the visual quality of the subsequently generated transformed vector object. In one example, the transformation system is operable to leverage a pairing algorithm that is configured to receive as input the morphing costs to generate the mapping of paths.

For instance, the morphing costs (e.g., the geometric costs, spatial costs, and volumetric costs as described above) are normalized, weighted, and consolidated into a cost matrix. Continuing with this example, the pairing algorithm is a Hungarian pairing algorithm that receives the cost matrix as input and generates least cost path pairs between the first paths and the second paths. The transformation system is further operable to suppress high-cost pairings that are above a cost threshold, as well as generate path pairs for any unmatched paths by generating one or more artificial paths.

Based on the mapping, the transformation system is operable to generate a transformed vector object, e.g., as a transformation of the first vector object, by adjusting a property of at least one of the first paths. In an example, the properties include one or more of a geometry (e.g., shape, orientation, size, etc.), appearance (e.g., color, gradient, fill, etc.), and/or z-order (e.g., overlap order of constituent entities) of the at least one first path and generating the transformed vector object includes linearly interpolating one or more of these properties. In some implementations, linearly interpolating the z-order includes employing a z-order cross-fading scheme to control an z-order migration of a path. In this way, the techniques described herein enable various properties of a first vector object and a second vector object to be blended to produce transformed vector objects that represent realistic intermediates with visual properties of both the first vector object and the second vector object.

In the following discussion, an example environment is first described that employs examples of techniques described herein. Example procedures are also described which are performable in the example environment and other environments. Consequently, performance of the example procedures is not limited to the example environment and the example environment is not limited to performance of the example procedures.

Example Environment

FIG. 1 is an illustration of a digital medium environment 100 in an example implementation that is operable to employ the vector object blending techniques described herein. The illustrated environment 100 includes a computing device 102, which is configurable in a variety of ways.

The computing device 102, for instance, is configurable as a desktop computer, a laptop computer, a mobile device (e.g., assuming a handheld configuration such as a tablet or mobile phone as illustrated), one or more processing devices and so forth. Thus, the computing device 102 ranges from full resource devices with substantial memory and processor resources (e.g., personal computers, game consoles) to a low-resource device with limited memory and/or processing resources (e.g., mobile devices). Additionally, although a single computing device 102 is shown, the computing device 102 is also representative of a plurality of different devices, such as multiple servers utilized by a business to perform operations "over the cloud" as described in FIG. 11.

The computing device 102 is illustrated as including a content processing system 104. The content processing system 104 is implemented at least partially in hardware of the computing device 102 to process and transform digital content 106, which is illustrated as maintained in storage 108 of the computing device 102. Such processing includes creation of the digital content 106, modification of the digital content 106, and rendering of the digital content 106 in a user interface 110 for output, e.g., by a display device 112. Although illustrated as implemented locally at the computing device 102, functionality of the content processing system 104 is also configurable as whole or part via functionality available via the network 114, such as part of a web service or "in the cloud."

An example of functionality incorporated by the content processing system 104 to process the digital content 106 is illustrated as a transformation module 116. The transformation module 116 is configured to generate a transformed vector object 118 (e.g., as a transformation of a source vector object) based on visual characteristics of the source vector object and a target vector object automatically and without user intervention, and thus increase creative customization capabilities while maintaining functionality of a mathematical representation. For instance, in the illustrated example the transformation module 116 receives input data 120 including a first vector object 122, e.g., a source vector object, and a second vector object 124, e.g., a target vector object. In this example, the first vector object 122 depicts a brown cow and the second vector object 124 depicts a black and white spotted cow that has horns.

The first vector object 122 includes a plurality of first paths and the second vector object 124 include a plurality of second paths. The transformation module 116 is operable to generate a mapping of paths between the first vector object 122 and the second vector object 124. Generally, the transformation module 116 generates the mapping of paths to minimize an overall morphing cost. As further described below, the transformation module 116 is operable to compute a variety of morphing costs in a variety of ways to minimize the overall morphing cost. By minimizing morphing costs, the techniques described herein enable generation of transformed vector objects 118 that depict recognizable intermediates between the first vector object 122 and the second vector object 124 while also enhancing computational efficiency.

Based on the mapping of paths, the transformation module 116 generates the transformed vector object 118 by adjusting a property of one or more paths of the first vector object 122. In the illustrated example, the transformation module 116 adjusts the geometry, appearance, and z-order of a plurality of paths from the first vector object 122, e.g., by linearly interpolating these properties based on the mapping of paths. In the illustrated example, a continuum 126 is rendered for display, and includes several examples of transformed vector objects 118 with varying levels of influence of visual characteristics of the brown cow and the spotted cow.

For instance, the leftmost vector object in the continuum 126 includes visual properties similar to the brown cow, while the rightmost vector object appears similar to the spotted cow. Accordingly, an example transformed vector object 118 denoted by a black box shares visual properties of both the brown cow and the spotted cow, e.g., has a color in between brown and white, has a body shape that shares attributes of the brown cow and the spotted cow, has some small black spots, and has small horns. In this way, the techniques described herein overcome the limitations of conventional techniques by enabling creative customization of vector objects based on visual characteristics of multiple vector objects, while maintaining functionality of a mathematical representation associated with vector output. Further discussion of these and other techniques are included in the following section and shown using corresponding figures.

Vector Object Blending

Figure 2:
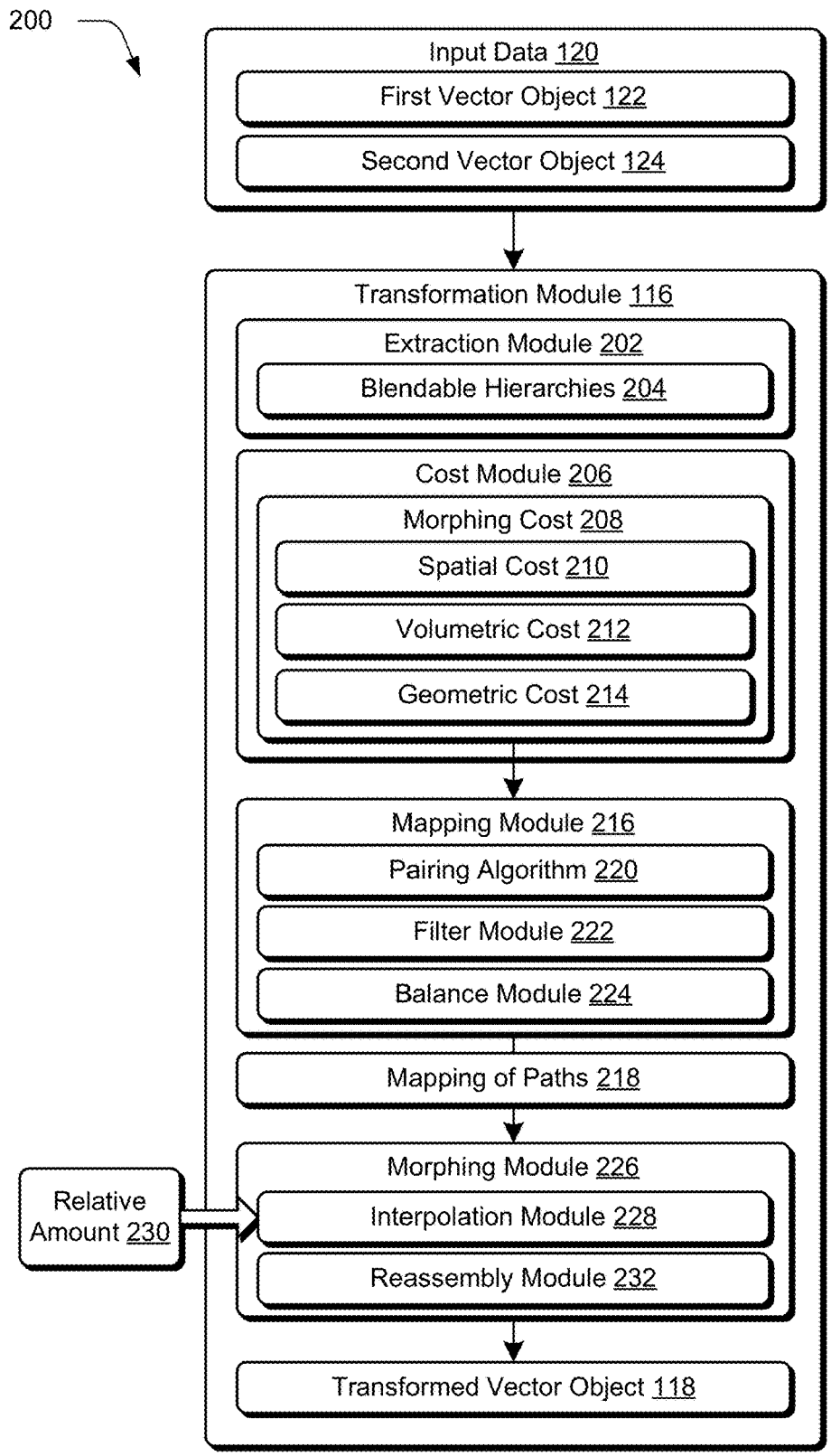
FIG. 2 depicts a system in an example implementation showing operation of a transformation module.
Figure 3:
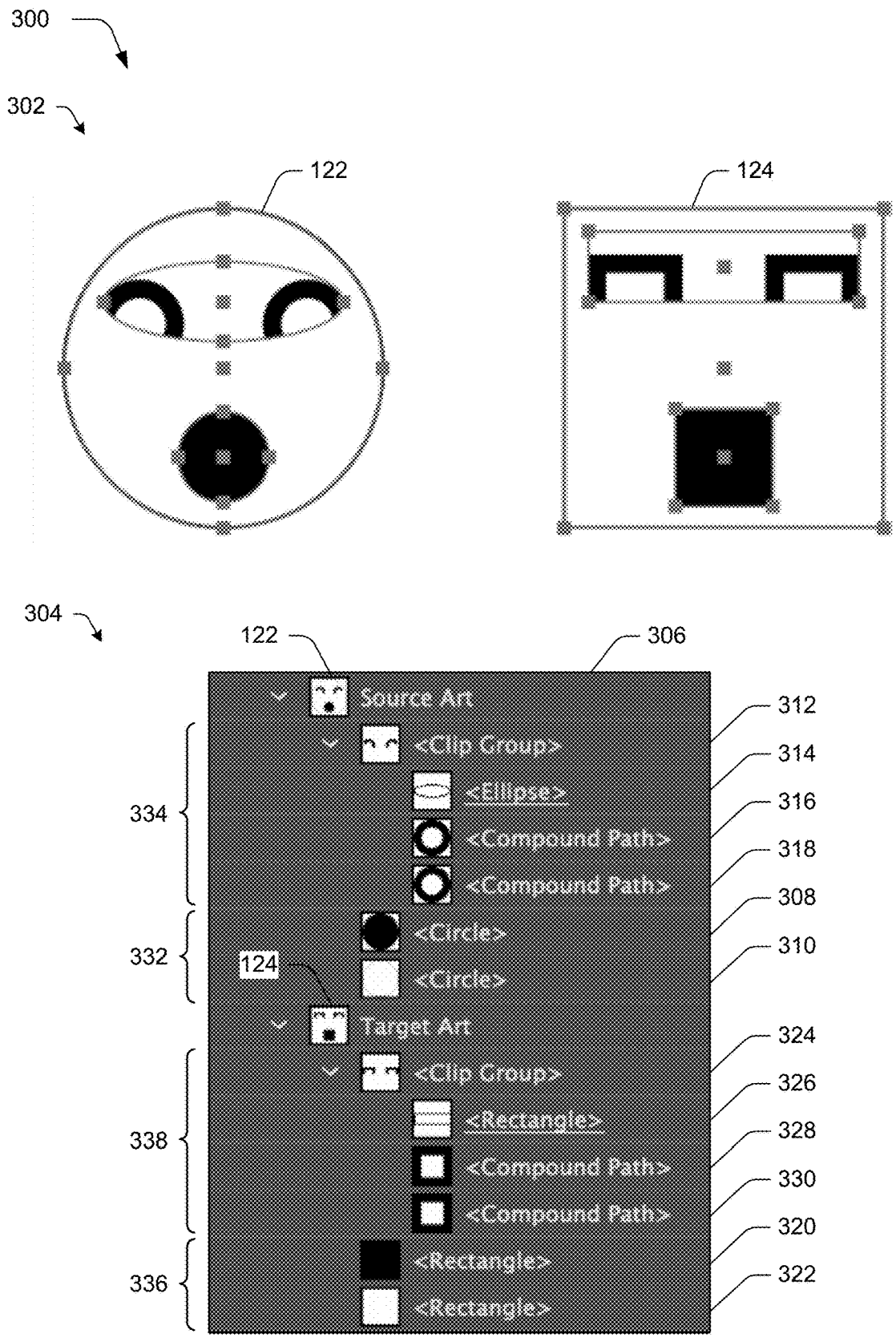
FIG. 3 depicts an example of vector object blending illustrating functionality of an extraction module to generate blendable hierarchies.
Figure 4:
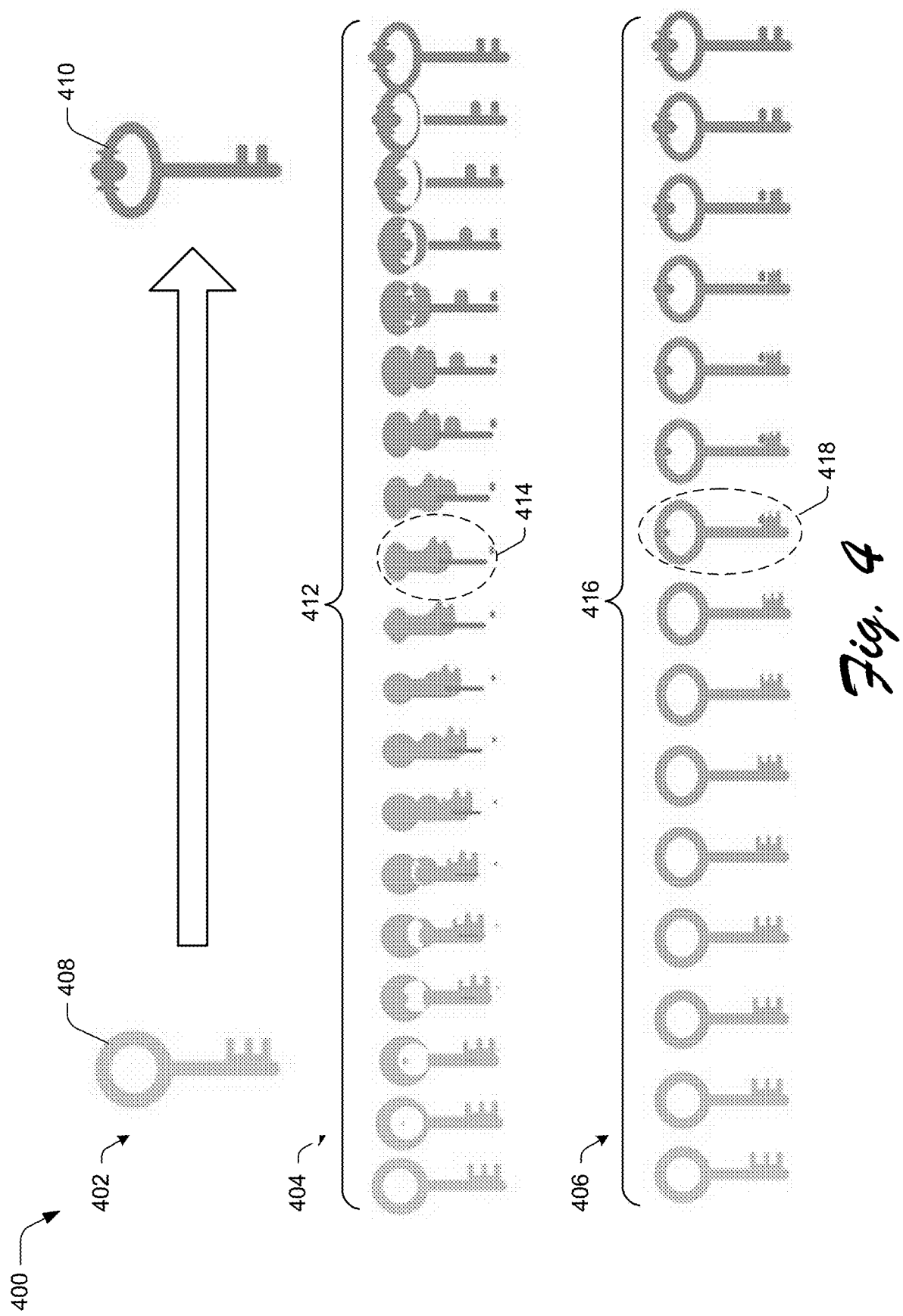
FIG. 4 depicts an example of vector object blending illustrating generation of transformed vector objects including compound paths.
Figure 5:
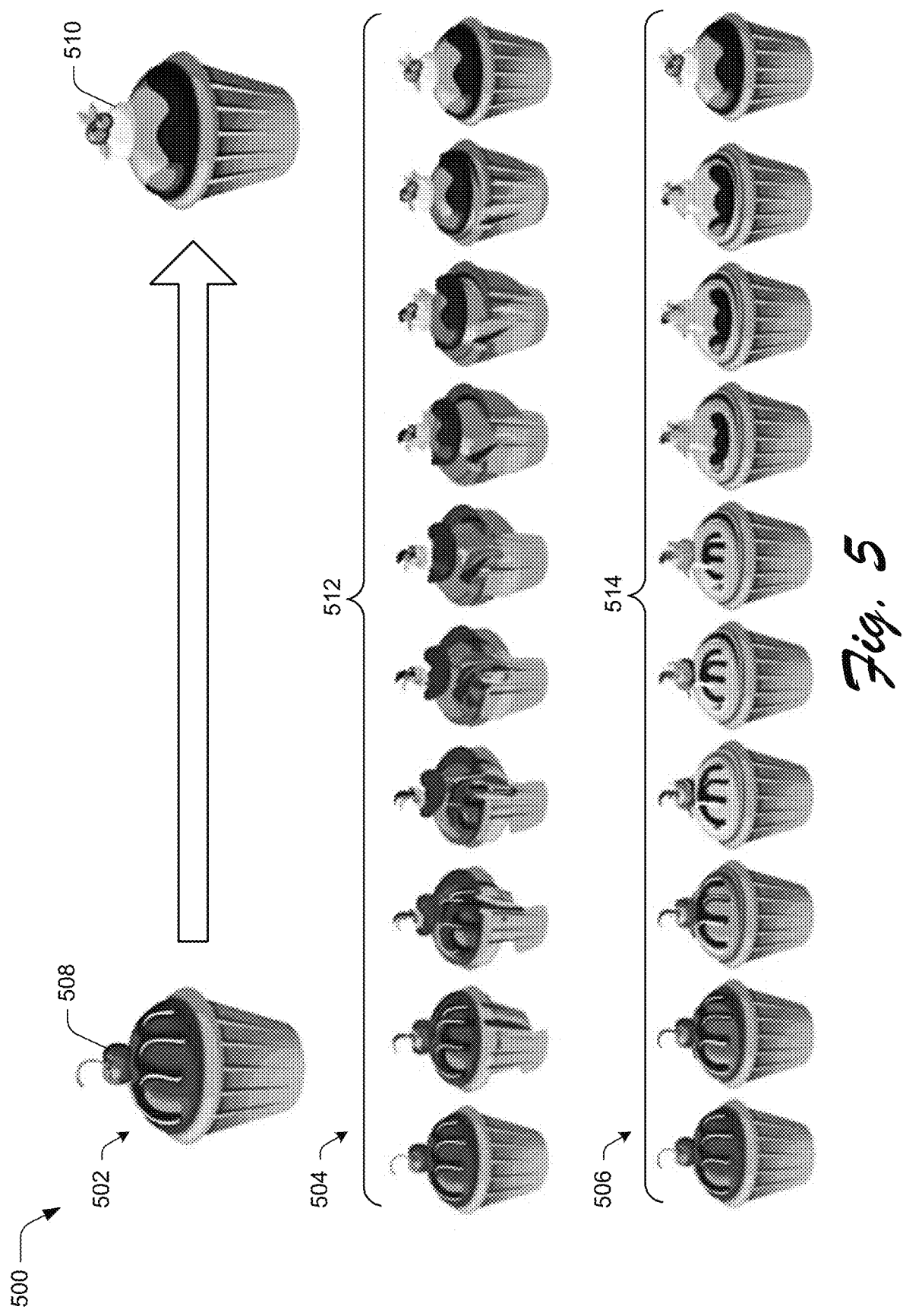
FIG. 5 depicts an example of vector object blending illustrating generation of transformed vector objects including clipping groups.
Figure 6A:
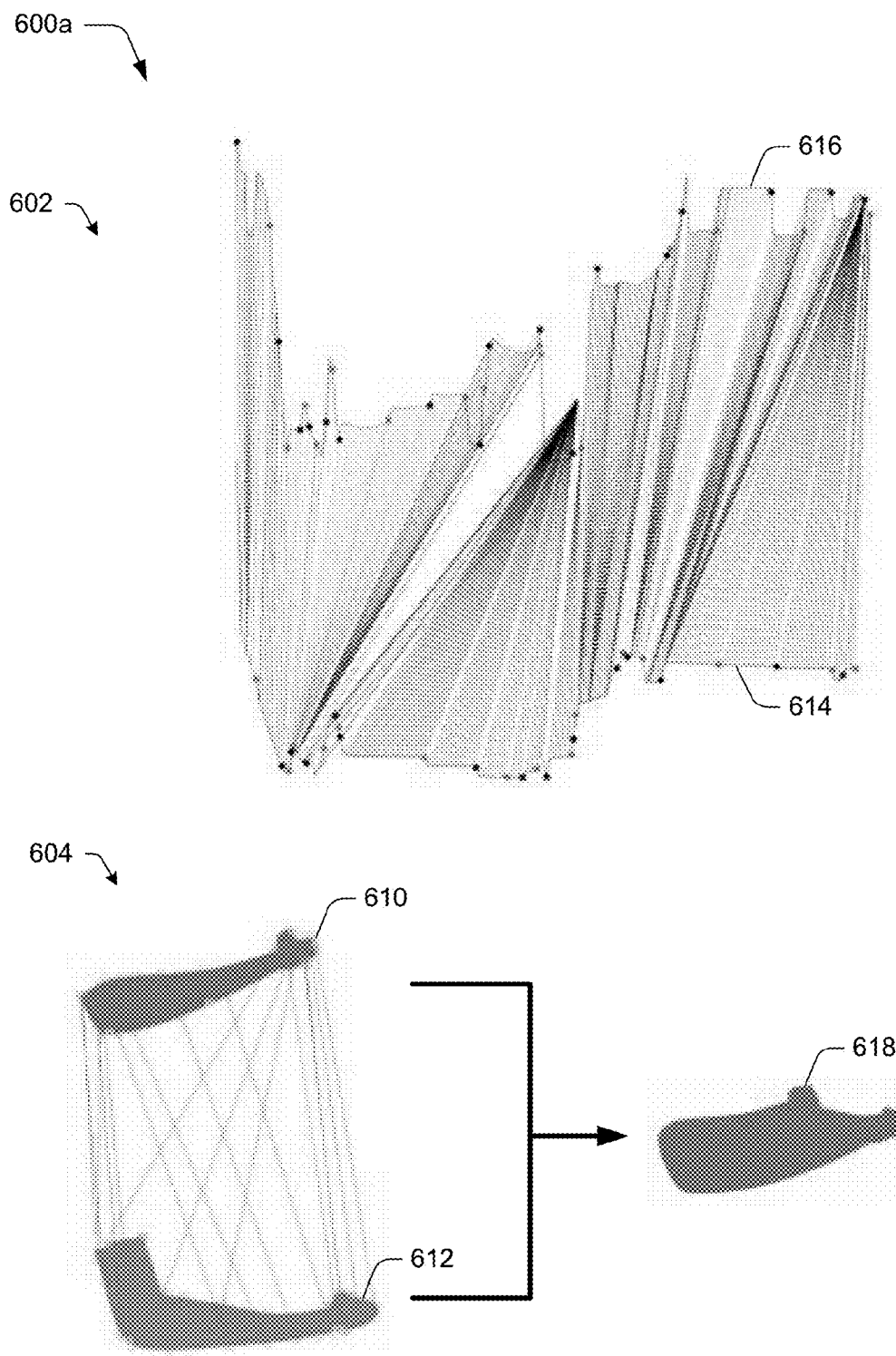
FIGS. 6a and 6b depict an example of vector object blending illustrating advantages of using neighborhood enriched dynamic time warping.
Figure 6B:
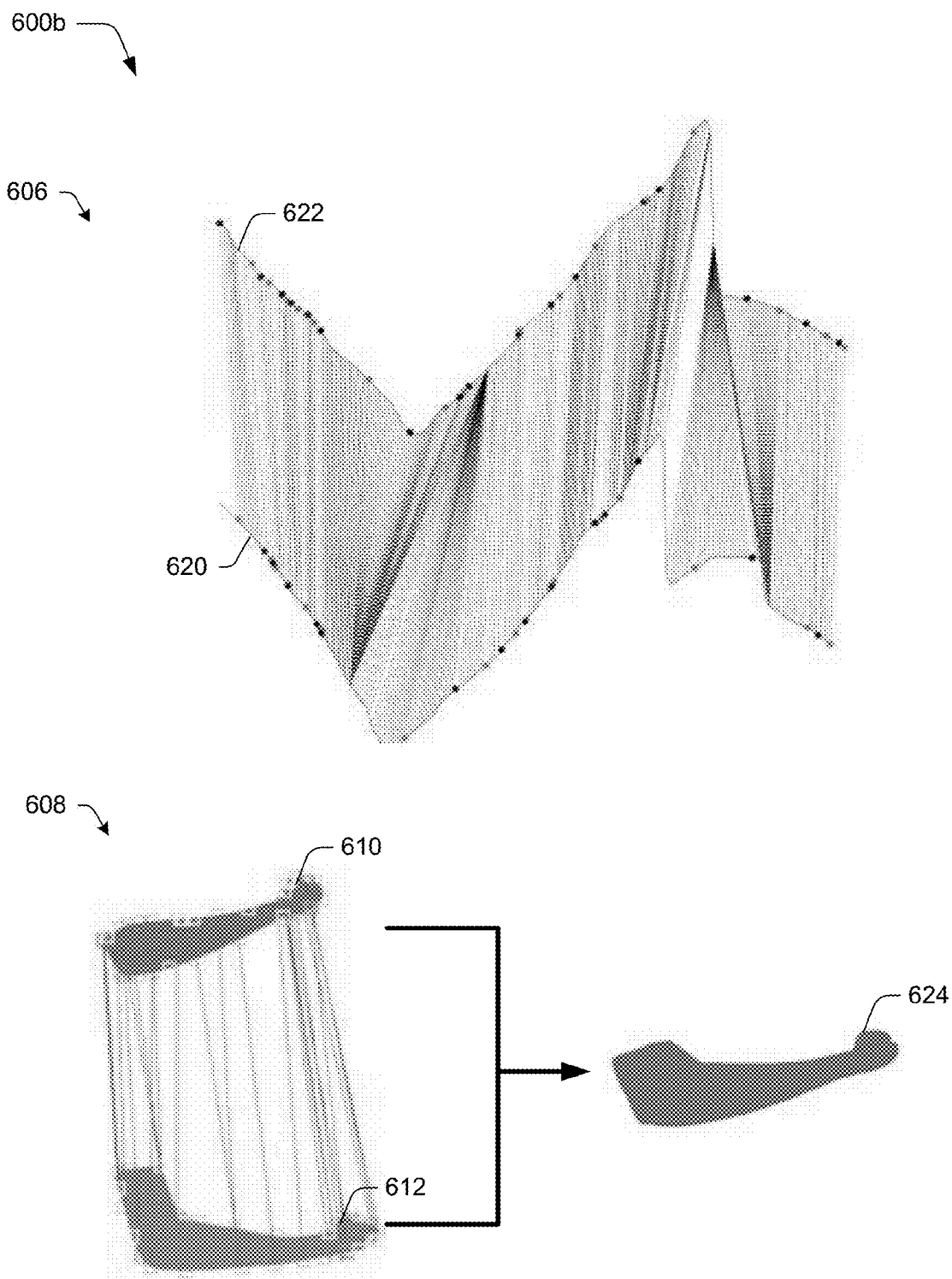
Figure 7:
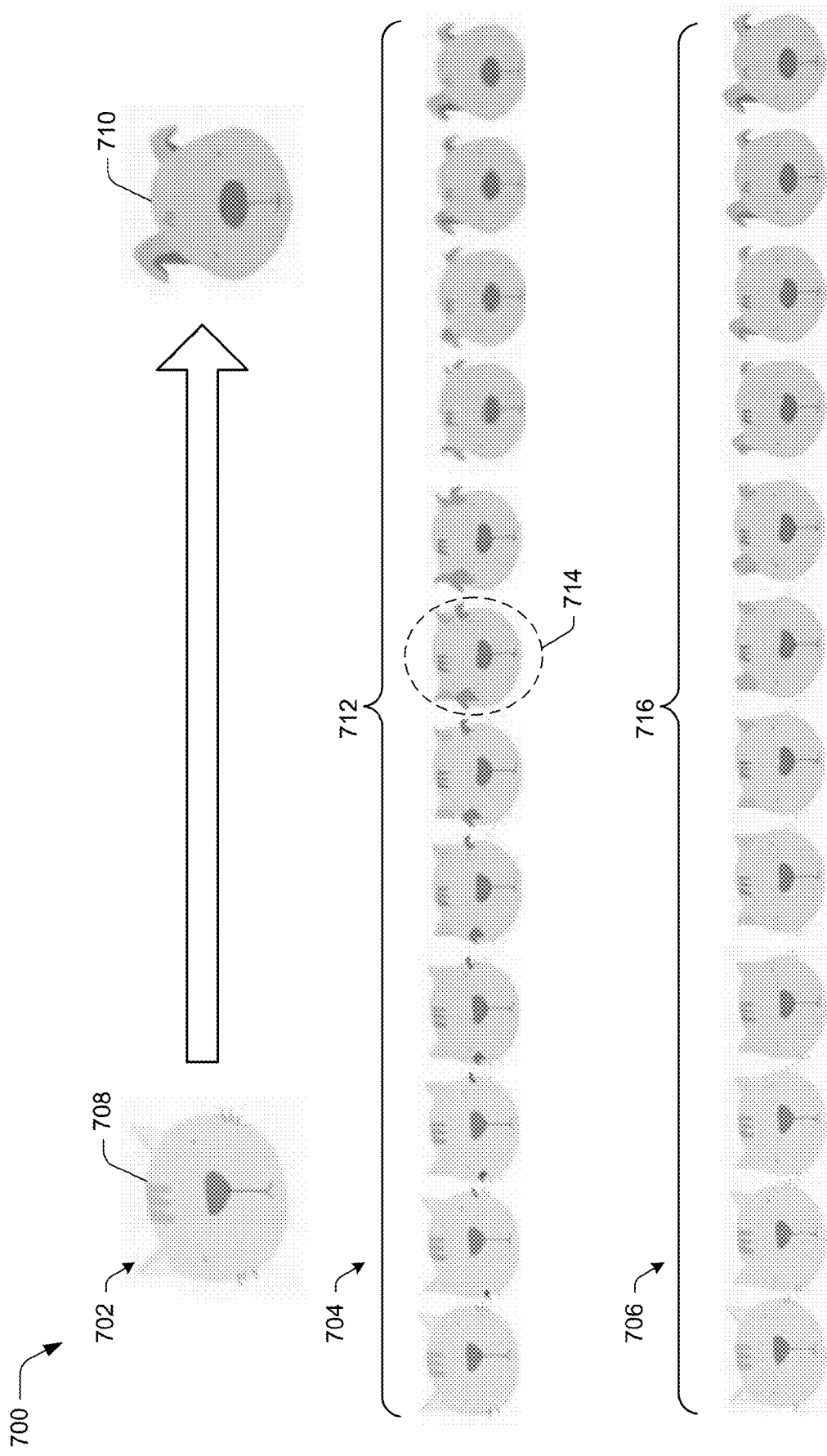
FIG. 7 depicts an example of vector object blending illustrating advantages of using high-cost outlier suppression.
Figure 8:
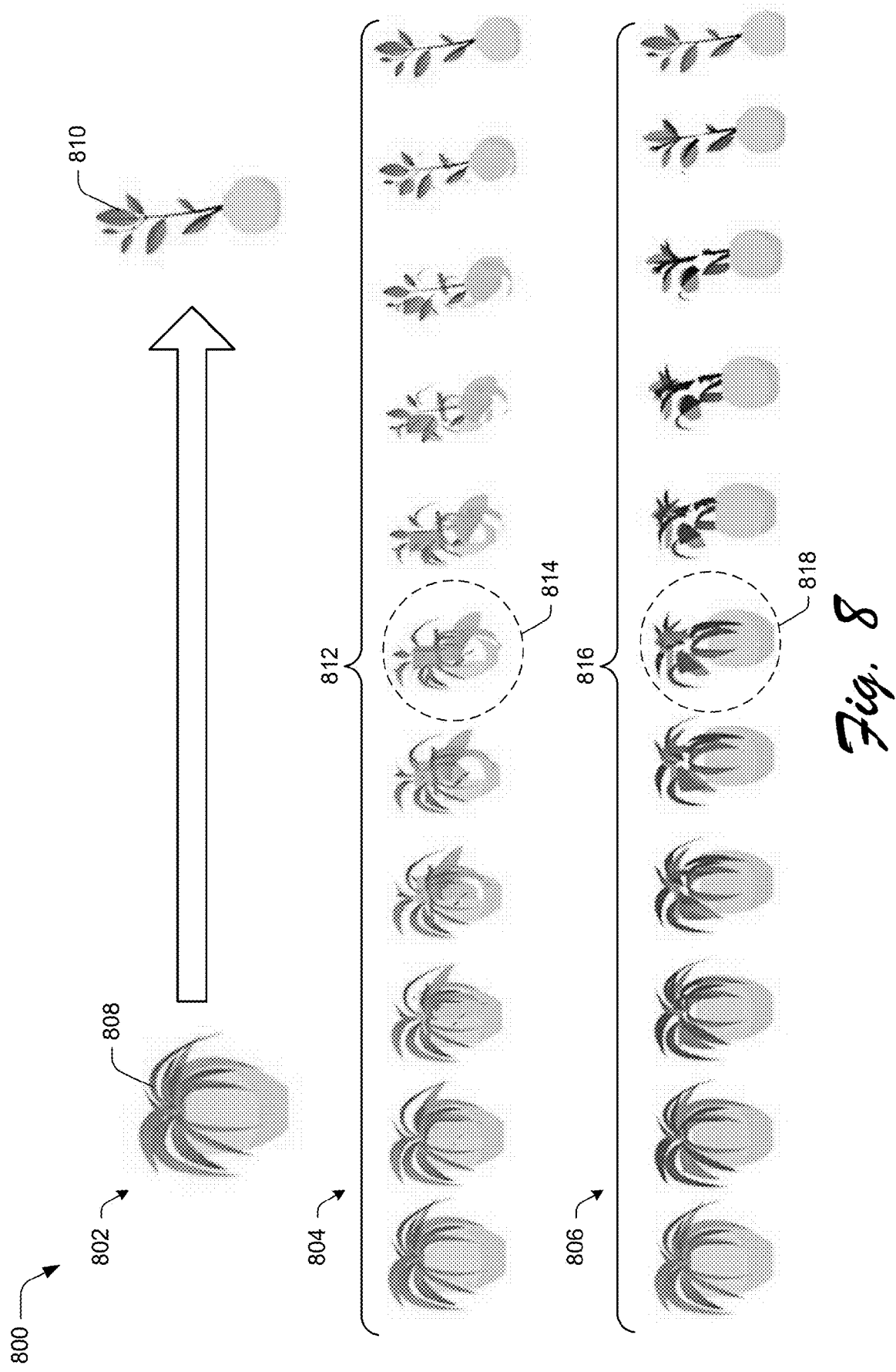
FIG. 8 depicts an example of vector object blending illustrating advantages of using z-order cross-fading.
Figure 9:
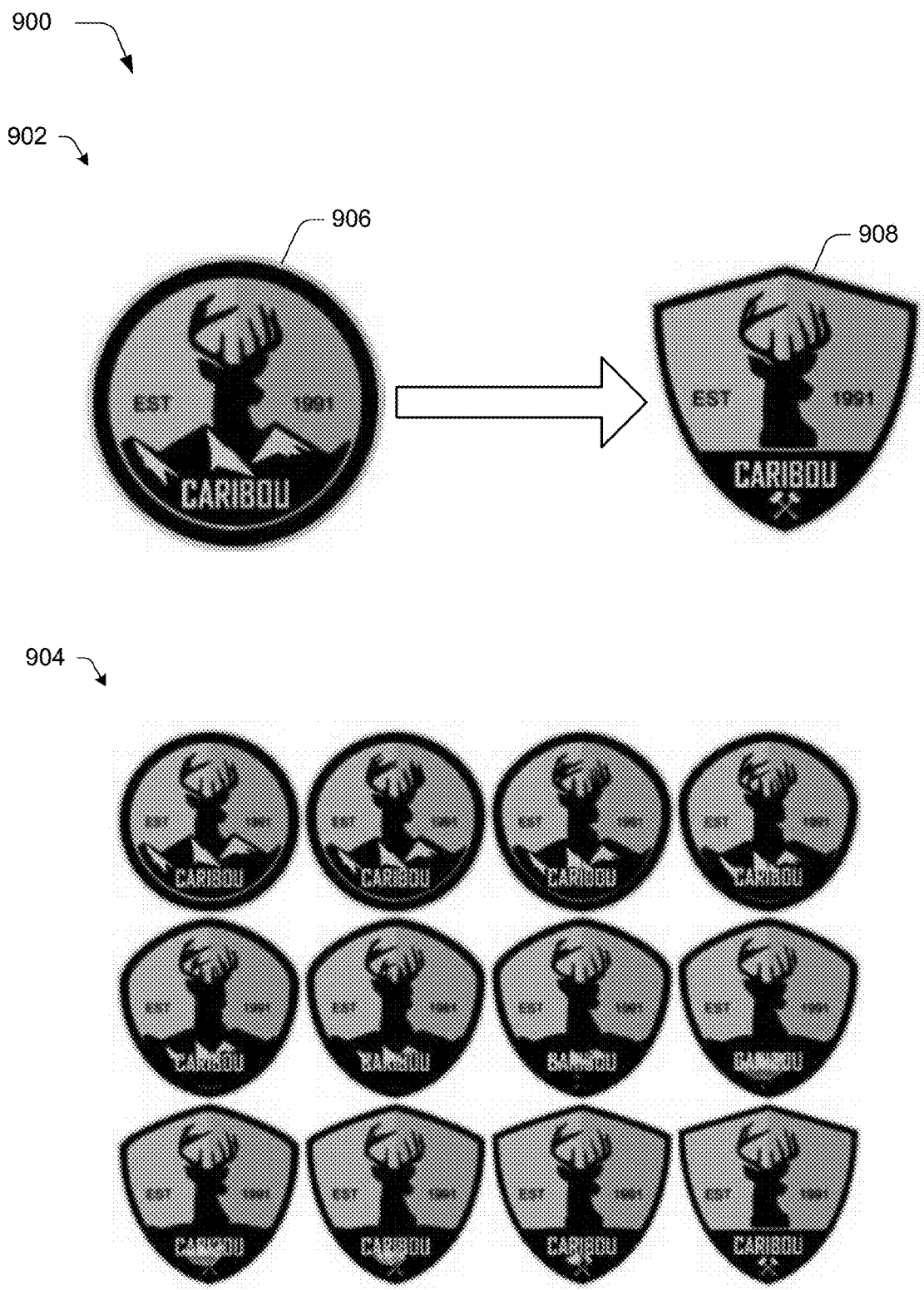
FIG. 9 depicts an example of vector object blending to generate a plurality of transformed vector objects.
Figure 10:
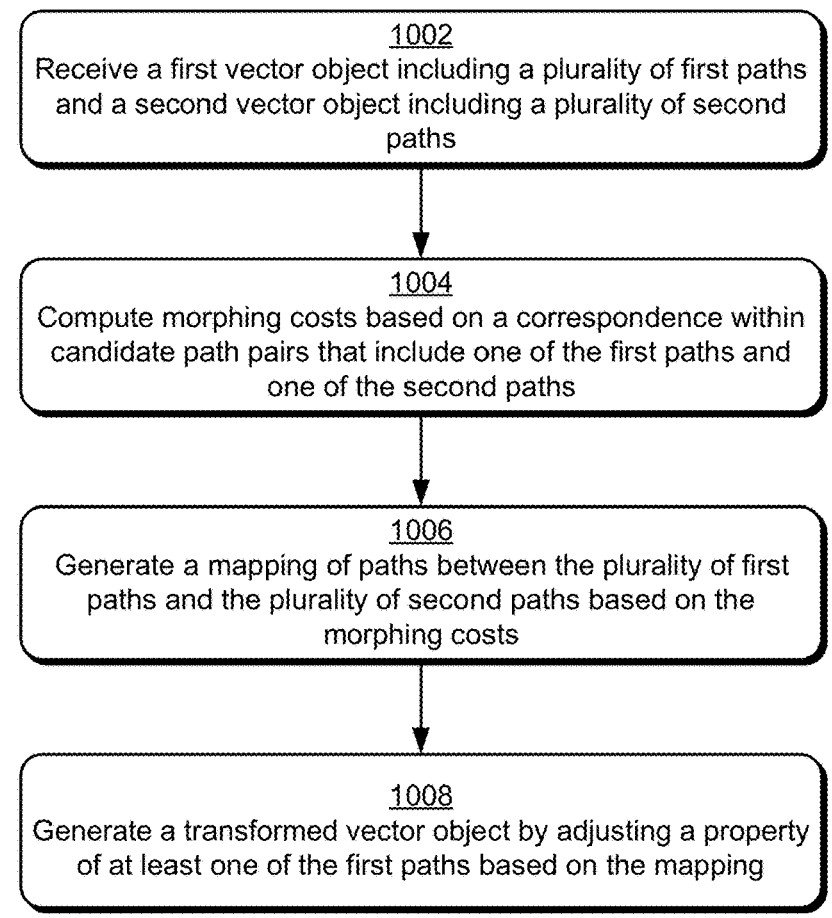
FIG. 10 depicts a procedure in an example implementation of vector object blending.

FIG. 2 depicts a system 200 in an example implementation showing operation of a transformation module 116. FIG. 3 depicts an example 300 of vector object blending illustrating functionality of an extraction module to generate blendable hierarchies. FIG. 4 depicts an example 400 of vector object blending illustrating generation of transformed vector objects including compound paths. FIG. 5 depicts an example 500 of vector object blending illustrating generation of transformed vector objects including clipping groups. FIGS. 6a and 6b depicts an example 600a, 600b of vector object blending illustrating advantages of using neighborhood enriched dynamic time warping. FIG. 7 depicts an example 700 of vector object blending illustrating advantages of using high-cost outlier suppression. FIG. 8 depicts an example 800 of vector object blending illustrating advantages of using z-order cross-fading. FIG. 9 depicts an example 900 of vector object blending to generate a plurality of transformed vector objects. FIG. 10 depicts a procedure 1000 in an example implementation of vector object blending.

The following discussion describes techniques that are implementable utilizing the previously described systems and devices. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-10.

Generating Blendable Hierarchies

To begin in this example, a transformation module 116 receives input data 120 that describes a first vector object 122 and a second vector object 124 (block 1002). The first vector object 122 includes a plurality of first paths, and the second vector object 124 includes a plurality of second paths. In various examples, the paths of the first vector object 122 and/or the second vector object 124 are organized into one or more path groups including simple groups and/or complex groups such as compound paths, and/or clipping groups. This is by way of example and not limitation, and a variety of additional path groups are considered as well.

Generally, a simple group provides meaningful organization to a number of paths, for instance to organize the paths in a particular geometric configuration. A compound path is usable to control fill regions of grouped entities (e.g., lines, shapes, bodies, etc.) by implementing rules such as even-odd filling and/or non-zero winding. Clipping groups are implemented to customize the geometry of constituent entities of a vector object and are further usable to occlude or stencil the constituent entities in various regions of the vector object. Accordingly, the path groups include functionality that define a variety of visual effects for vector objects. In some examples, the first vector object 122 and/or the second vector object 124 include groups of groups, e.g., groups that are "nested" within one or more other groups. Conventional techniques fail to provide consideration for complex groups, and thus are unable to include functionality of path groups in morphed vector objects.

To address these limitations, in some examples the transformation module 116 includes an extraction module 202 that is operable to generate one or more blendable hierarchies 204 from the first vector object 122 and one or more corresponding blendable hierarchies 204 from the second vector object 124. Generally, the blendable hierarchies 204 organize paths of the same path group (e.g., simple groups, clipping groups, compound paths) such that path groups of the first vector object 122 are matchable with alike path groups of the second vector object 124. Thus, simple groups of the first vector object 122 are matched with simple groups of the second vector object 124, compound paths of the first vector object 122 are matched with compound paths of the second vector object 124, and clipping groups of the first vector object 122 are matched with clipping groups of the second vector object 124.

In an example, complex groups are matched based on correspondence between key paths of the complex groups. For instance, a largest and topmost path is a key path for a compound path, and a path that clips other paths is a key path for a clipping group. The key paths of the complex groups are matched using the cost computation and mapping techniques further described below, e.g., using a pairing algorithm to find a least cost mapping of the key paths. The transformation module 116 is then operable to individually process the matched path groups in accordance with the techniques described below, and subsequently reassemble the path groups as part of generating the transformed vector object 118. In this way, the transformation system ensures that the transformed vector object 118 includes the functionality and visual effects imparted by the complex groups.

Example operations of the extraction module 202 are illustrated in an example 300 of FIG. 3 in a first stage 302 and a second stage 304. As shown in first stage 302, an example of a first vector object 122, e.g., a "source art", depicts circular features, and an example of a second vector object 124, e.g., a "target art", depicts rectangular features. The second stage 304 depicts a representation 306 of path groups that define the first vector object 122 and the second vector object 124. As illustrated, the first vector object 122 includes two simple groups such as a first circle 308 and a second circle 310. The first vector object 122 also includes a first clipping group 312 that includes an ellipse 314, a first circular compound path 316, and a second circular compound path 318. Similarly, the second vector object 124 includes two simple groups such as a first rectangle 320 and a second rectangle 322. The second vector object 124 also includes a second clipping group 324 that includes a third rectangle 326, a first rectangular compound path 328, and a second rectangular compound path 330.

Based on the groups of paths, the extraction module 202 is operable to generate two top-level blendable hierarchies for the first vector object 122. For instance, the extraction module 202 generates a first simple blendable hierarchy 332 that includes the simple groups such as the first circle 308 and the second circle 310. The extraction module 202 also generates a first complex blendable hierarchy 334 that includes the complex groups, e.g., the first clipping group 312. Similarly, the extraction module 202 generates corresponding blendable hierarchies 204 for the second vector object 124. For instance, a second simple blendable hierarchy 336 includes the simple groups, e.g., the first rectangle 320 and the second rectangle 322. A second complex blendable hierarchy 338 includes the complex groups, e.g., the second clipping group 324. The extraction module 202 is further operable to repeat the process of generating blendable hierarchies 204 for nested path groups, such as the compound paths 316, 318, 328, and 330 in this example.

Based on the blendable hierarchies 204, the transformation module 116 is operable to individually process the path groups one-by-one in accordance with the techniques as described in more detail below. For instance, continuing the above example, paths of the first simple blendable hierarchy 332 are matched with paths of the second simple blendable hierarchy 336. Similarly, paths of the first complex blendable hierarchy 334 are matched with paths of the second complex blendable hierarchy 338.

In this way, paths from simple groups of the first vector object 122 are matched with paths from simple groups of the second vector object 124, compound paths of the first vector object 122 are matched to compound paths of the second vector object 124, and clipping groups of the first vector object 122 are matched to clipping groups of the second vector object 124. The transformation module 116 is thus operable to separately process paths according to path groups and subsequently reassemble them as further described below. In this way, the techniques described herein support inclusion of complex groups such as clipping groups and compound paths in a subsequently generated transformed vector object 118 without a loss in visual quality or underlying functionality of the path groups.

An example 400 of this functionality is depicted in FIG. 4 in a first stage 402, a second stage 404, and a third stage 406. In this example, as shown in the first stage 402, a first vector object 122 depicts a first key 408 with three prongs and a circular head. A second vector object 124 depicts a second key 410 with two prongs, and an stylized, ovaloid head shape. Further, the first key 408 and the second key 410 include a plurality of compound paths. Second stage 404 depicts a continuum 412 that represents attempted blending of the first key 408 and the second key 410 without providing consideration for the complex groups, e.g., the compound paths. Consequently, vector objects included in the continuum 412 contain visual artifacts and do not depict realistic intermediates. For instance, a vector object 414 depicts an amorphous, poorly defined shape that is not identifiable as a key.

In contrast, third stage 406 depicts a continuum 416 that represents blending the first key 408 with the second key 410 in accordance with the techniques described herein. This includes leveraging the extraction module 202 to generate blendable hierarchies 204, in conjunction with the techniques as further described below. Based on the blendable hierarchies, the transformation module 116 is operable to retain the functionality and visual effects of the plurality of compound paths included in the first key 408 and the second key 410. Accordingly, a subsequently generated transformed vector object 118, e.g., a third key 418, is artifact free and is of superior visual quality when compared with the limitations depicted in second stage 404.

A further example 500 of this functionality is depicted in FIG. 5 in a first stage 502, a second stage 504, and a third stage 506. In this example, as shown in the first stage 502, a first vector object 122 depicts a cherry cupcake 508 and a second vector object 124 depicts a blueberry cupcake 510. In this example, the cherry cupcake 508 and the blueberry cupcake 510 include a plurality of clipping groups. Second stage 504 depicts a continuum 512 that represents attempted blending of the cherry cupcake 508 and the blueberry cupcake 510 without accommodation for the complex groups, e.g., the clipping groups. Consequently, the vector objects included in the continuum 512 include visual artifacts and do not depict realistic intermediates between the cherry cupcake 508 and the blueberry cupcake 510.

In contrast, third stage 506 depicts a continuum 514 that represents blending the cherry cupcake 508 with the blueberry cupcake 510 in accordance with the techniques described herein, for instance leveraging the extraction module 202 to generate blendable hierarchies 204. Based on the blendable hierarchies 204, the transformation module 116 is operable to retain the functionality and visual effects of the plurality of clipping groups included in the first vector object 122 (e.g., the cherry cupcake 508) and the second vector object 124 (e.g., the blueberry cupcake 510). Accordingly, the transformed vector objects 118 included in the continuum 514 are artifact free and represent usable intermediates which overcomes the limitations depicted in second stage 504.

Morphing Cost Computation

Continuing the discussion on how to generate the transformed vector object 118, the transformation module 116 is employed to generate path pairs that include one of the first paths (e.g., a path from the first vector object 122) and one of the second paths, e.g., a path from the second vector object 124. As discussed above, in examples in which the first vector object 122 and second vector object 124 include one or more path groups (e.g., simple groups, clipping groups, compound paths, etc.) path pairs are generated between analogous path groups according to the one or more blendable hierarchies 204. Further, to augment the visual quality of the transformed vector object 118, an objective in generating the path pairs is to reduce a cost to blend the paths of the path pairs, i.e., morphing costs 208.

Accordingly, the transformation module 116 includes a cost module 206 that is operable to compute morphing costs 208 based on a correspondence within candidate path pairs that include one of the first paths and one of the second paths (block 1004). The candidate path pairs include one of the first paths from the first vector object 122 and one of the second paths from the second vector object 124. In an example, candidate path pairs are generated for each possible combination of path pairs between the first paths and the second paths. The cost module 206 is operable to determine the correspondence based on a variety of factors such as a spatial correspondence, a volumetric correspondence, and/or a geometric correspondence. Accordingly, in various implementations, the morphing costs 208 include one or more of a spatial cost 210, a volumetric cost 212, and/or a geometric cost 214 that describe such correspondences.

For instance, the cost module 206 is operable to determine a spatial cost 210 that indicates a cost of spatial displacement to blend one of the first paths with one of the second paths. Consider an example candidate path pair that includes one of the first paths and one of the second paths. To calculate the spatial cost 210 for the example candidate path pair, the cost module 206 computes a first offset distance of the first path from a center of the first vector object 122. The cost module 206 also computes a second offset distance of the second path from a center of the second vector object 124. The cost module 206 then computes the difference between the first offset distance and the second offset distance to determine the spatial cost 210. In some examples, the spatial cost 210 represents a two-dimensional measure that includes two cost metrics, e.g., an "x" and a "y" spatial cost for each Cartesian axis. In an alternative or additional example, multiple dimensions of the spatial cost 210 are integrated into a single metric. Minimization of the spatial cost (e.g., as part of generating a mapping as discussed below) prevents unnecessary path migration during blending.

The cost module 206 is also operable to generate a volumetric cost 212 that enables path pairs to include similarly sized paths. Consider the example candidate path pair that includes a first path and a second path as described above. To calculate the volumetric cost 212, the cost module 206 computes a horizontal span and a vertical span for the first path and for the second path. The cost module 206 calculates a difference between the horizontal span of the first path and the horizontal span of the second path, as well as a difference between the vertical span of the first path and the vertical span of the second path. The differences between these spans represent the volumetric cost 212.

In some examples, the volumetric cost 212 includes two cost metrics, e.g., one for horizontal span and one for vertical span. In an alternative or additional example, the volumetric cost 212 is integrated into a single metric. In various implementations, the volumetric cost 212 has a greater impact on visual properties associated with blending. That is, relatively slight discrepancies in horizontal/vertical span between the first path and second path result in visual artifacts. Accordingly, in some examples, the volumetric cost 212 is penalized on a logarithmic scale to reduce such volumetric discrepancies. In this way, the techniques described herein prevent large objects from blending to small objects and vice versa during subsequent blending.

The cost module 206 is also operable to compute a geometric cost 214 that indicates a geometric concurrence between the first path and the second path of the candidate path pair, e.g., an "edit distance" between a geometry of the first path and a geometry of the second path. To calculate the geometric cost 214, the cost module 206 leverages a neighborhood enriched dynamic time warping ("DTW") to compute a distance between the first path and the second path as a measure for the geometric cost 214. DTW provides a mechanism to compare two temporal series of possibly unequal lengths and finds an optimal mapping of each of the sampled points between terminal points (i.e., start and end points) of the series.

To calculate the geometric cost 214 for an example candidate path pair, the cost module 206 first normalizes the first path and second path to account for possible rotations of the first path and/or the second path. In one embodiment, Principal Component Analysis ("PCA") using bounding ellipsoids of paths and Procrustes analysis is used to normalize the input paths for rotation, for instance as described by Ross, et. al. Procrustes analysis. Depaitment of Computer Science and Engineering, University of South Carolina, SC 29208. The cost module 206 is also operable to convert the first path and second path to an input series, e.g., a series of points, that are able to be analyzed using DTW.

Further, the cost module 206 enriches the input series with regional (e.g., locality) information. For instance, the cost module 206 defines a neighborhood of size "n." The cost module 206 is thus operable to consider the influence of n/2 points to the left and n/2 points to the right of each point in the input series, e.g., as an average of x and y gradient values in the neighborhood n. In this way, the techniques described herein accommodate for pronounced regional changes associated with blending complex vector objects. Accordingly, the cost module 206 leverages neighborhood enriched DTW to find the geometric cost 214 between control points of the first path and the second path to reduce an amount that the geometry of a particular path changes unnecessarily during blending.

Examples 600a, 600b illustrate advantages of neighborhood enriched DTW compared to conventional DTW as shown in FIGS. 6a, 6b in a first stage 602, a second stage 604, a third stage 606, and a fourth stage 608. For instance, FIG. 6a depicts an example of conventional DTW that does not use the neighborhood enrichment techniques as described herein. An example candidate path pair includes a first path from a first vector object 122 that depicts a forearm of a first arm 610 and a second path from a second vector object 124 that depicts a second arm 612 including a bicep and a forearm.

As depicted in first stage 602, the first path is shown at 614 and the second path is shown at 616 in an example conventional DTW mapping. Point mappings of the first path to the second path are depicted by the lines in between the first path 614 and the second path 616. Notably, conventional DTW fails to capture significant regional variations between the first vector object 122 and the second vector object 124, e.g., a significant regional difference in the upper arm area between the first arm 610 and the second arm 612, and thus the mapping lines are disjointed and irregular.

Accordingly, as depicted in second stage 604, an attempt to blend the first arm 610 and the second arm 612 based on conventional DTW techniques results in generation of a vector object 618 with significant visual artifacts. For instance, the pink lines denote point mappings of the first arm to the second arm. Notably, several anchor mappings connect a thumb of the first arm 610 to a bicep region of the second arm 612. Thus, the attempted blending causes the thumb to be "pulled back" to the bicep region and the vector object 618 is not recognizable as an arm.

In contrast, FIG. 6b depicts an example implementation of neighborhood enriched DTW. In this example, as depicted in third stage 606, the first path is shown at 620 and the second path is shown at 622. By considering regional information, the neighborhood enriched DTW considers the significant regional difference in the upper arm area between the first arm 610 and the second arm 612. Accordingly, the mapping lines between the first path and second path are relatively parallel compared to the mapping lines depicted in first stage 602. Further, as shown in fourth stage 608, the mappings between the first arm 610 and second arm 612 are also relatively parallel and match similar regions of the first arm 610 to similar regions of the second arm 612. Thus, generating a transformed vector object 118 based on the first arm 610 and the second arm 612 in accordance with the techniques described herein, for instance utilizing neighborhood enriched DTW to compute morphing costs 208, results in reduced incidence of visual artifacts. Accordingly, the transformed vector object depicted at 624 is recognizable as an arm and is superior in visual quality to the vector object 618.

Generating a Mapping of Paths

Once the morphing costs 208 are computed by the cost module 206, a mapping module 216 is operable to generate a mapping of paths 218 between the plurality of first paths and the plurality of second paths based on the morphing costs 208 (block 1006). Generally, the mapping of paths 218 represents a plurality of path pairs that minimizes the overall morphing costs 208, and thus improves the visual quality of the transformed vector object 118 in subsequent blending, i.e., generation of the transformed vector object 118. In various examples, the morphing costs 208 are configured as a cost matrix that includes the spatial cost 210, volumetric cost 212, and geometric cost 214 for each candidate path pair.

For example, the mapping module 216 generates the cost matrix as an n*m matrix, where n is the number of first paths and m is the number of second paths. The mapping module 216 is operable to normalize the costs using min-max normalization to remap the morphing costs 208 to a common range, e.g., a [0-1] range. In an example, the mapping module 216 computes an overall cost for a candidate path pair "ij" where "i" is a first path and "j" is a second path according to the following formula:

$$C_{ij}=0.2*\|G_{ij}\|+0.22\|S_{x,ij}\|+0.22*\|S_{y,ij}\|+0.18*\|V_{x,ij}\|+0.18*\|V_{y,ij}\|$$

In this example, "$C_{ij}$" represents an overall cost for the candidate path pair ij. "G" represents the geometric cost 214, "S" represents the spatial cost 210, and "V" represents the volumetric cost 212. In this example, the spatial cost 210 includes two cost metrics, e.g., "$S_x$" represents spatial cost along an x-axis and "$S_y$" represents a spatial cost along a y-axis. Similarly, the volumetric cost 212 includes two cost metrics, for instance "$V_x$" represents a volumetric cost along an x-axis and "$V_y$" represents a volumetric cost along a y-axis. The "$\| \|$" represents the min-max normalization to remap the morphing costs to a [0-1] range. The numerical values represent respective weights, and in this example are configured to minimize the overall cost and reduce incidence of visual artifacts. However, this is by way of example and not limitation and the weights are adjustable. In one example, the weights for the spatial cost 210, volumetric cost 212, and geometric cost 214 are adjusted based on a user input, e.g., via the user interface 110 using one or more sliders, buttons, text inputs, etc. In this way, a user of the computing device 102 is able to control influence of individual costs that impact the visual appearance of a subsequently generated transformed vector object 118.

In an embodiment, the mapping module 216 leverages a pairing algorithm 220 that is configured to receive as input the morphing costs 208 to generate the mapping of paths 218. In an example, the pairing algorithm 220 is a Hungarian pairing algorithm, such as a Hungarian pairing algorithm described by Harold W. Kuhn. *The Hungarian method for the assignment problem*. Naval research logistics quarterly, 2(1-2):83-97, 1955. The pairing algorithm 220 receives as input the cost matrix as described above and generates low cost path pairs that include a first path and a second path. In this way, the mapping module 216 enables generation of a mapping of paths 218 that minimizes the overall cost, and further is independent of the initial arrangement of the first paths and second paths. This overcomes the limitations of conventional techniques, which are limited by the initial arrangement of paths.

As mentioned above, in examples in which the first vector object 122 and/or second vector object 124 include complex groups such as clipping groups and compound paths, the mapping module 216 is operable to generate the mapping of paths 218 based on key paths of the complex groups. In one example, the mapping module 216 is configured to ensure that key paths of analogous complex groups are paired with one another, for instance not with paths of other groups, by setting a morphing cost 208 for key path pairs to zero before inputting the cost matrix to the pairing algorithm 220. In this way, the mapping module 216 is configured to ensure key paths of complex groups are matched with one another, and thus preserve functionality of the complex groups when generating the mapping of paths 218.

As part of generating the mapping of paths 218, in some examples the mapping module 216 includes a filter module 222 that is operable to suppress high-cost outlier pairings, e.g., path pairs generated by the pairing algorithm 220 that have a high cost. High-cost path pairs have a propensity to cause visual artifacts in a subsequently generated transformed vector object 118. Accordingly, path pairs are suppressed if they are over a threshold cost value for one or more of the spatial cost 210, volumetric cost 212, geometric cost 214, and/or an overall cost. Thus, the quality of the resultant transformed vector object 118 is improved by filtering out path pairs with a high cost that would likely result in visual artifacts.

In an example, the filter module 222 suppresses a path pair "ij" where "i" is a first path and "j" is a second path according to the following criteria:

$$S_{ij}=\|C_{ij}\|>Z_{\|C\|1.7} \text{ and } (\|G_{ij}\|>Z_{\|C\|1.8} \text{ or}$$

$$\|S_{x,ij}\|>Z_{\|Sx\|1.8} \text{ or } \|S_{y,ij}\|<Z_{\|Sy\|1.8} \text{ or}$$

$\|V_{x,ij}\| > Z_{\|Vx\|1.8}$ or $\|V_{y,ij}\| > Z_{\|Vy\|1.8})$

In this example, $S_{ij}$ is a boolean value that if "true" the path pair ij is suppressed and if "false" the path pair ij is not suppressed. Similar to the above example, "G" represents the geometric cost 214, "S" represents the spatial cost 210, and "V" represents the volumetric cost 212. "$S_x$" represents spatial cost along an x-axis, "$S_y$" represents a spatial cost along a y-axis, "$V_x$" represents a volumetric cost along the x-axis, and "$V_y$" represents a volumetric cost along the y-axis.

"Z" represents a z-score, such that a z-score of x is defined as x*σ away from a mean cost, with σ being the standard deviation of the dataset. For instance, $Z_{\|C\|1.7}$ represents a z-score of 1.7 for normalized overall cost $C_{ij} \forall i,j$. Accordingly, in an example if the overall morphing cost 208 has a greater z-score than 1.7, and if one or more of the spatial cost 210, volumetric cost 212, or geometric cost 214 have a z-score greater than 1.8, the path pair ij is rejected, and not included as part of the mapping of paths 218. This is by way of example and not limitation, and the values for z-scores vary in other implementations.

An example 700 of the advantages of filtering high-cost outliers is depicted in FIG. 7 in a first stage 702, a second stage 704, and a third stage 706. In this example, as shown in the first stage 702, a first vector object 122 depicts a cat 708 and a second vector object 124 depicts a dog 710. Second stage 704 depicts a continuum 712 that represents attempted blending of the first vector object 122, e.g., the cat 708, and the second vector object 124, e.g., the dog 710, without suppressing high-cost outliers. Consequently, vector objects included in a continuum 712 include visual artifacts and do not depict realistic intermediates. For instance, as depicted by the vector object 714, whiskers from the cat 708 are blending with ears from the dog 710.

In contrast, third stage 706 depicts a continuum 716 that represents blending the first vector object 122 with the second vector object 124 in accordance with the techniques described herein. In this example, the filter module 222 suppresses high-cost outlier path pairs, e.g., path pairs including paths associated with the whiskers of the cat 708 and the ears of the dog 710. Accordingly, subsequently generated transformed vector objects 118 are artifact free and are of superior visual quality when compared with the limitations depicted in second stage 704.

In some examples, the mapping module 216 further includes a balance module 224. Consider an example in which the first vector object 122 includes m number of paths and the second vector object 124 includes n number of paths. The pairing algorithm 220 is configured to generate a one-to-one mapping, and thus generates min(m,n) number of path pairs. Accordingly, if the first vector object 122 has less paths than the second vector object 124, the second vector object 124 will have one or more unmatched paths after matching is performed using the pairing algorithm 220. Likewise, if the second vector object 124 has less paths than the first vector object 122, the first vector object 122 will have one or more unmatched paths. Further, in some instances suppression of high-cost path pairs by the filter module 222 creates one or more unmatched paths.

Accordingly, the balance module 224 is operable to process unmatched paths of the first vector object 122 and/or the second vector object 124 to create a one-to-one mapping for each path, such that the first paths and second paths are each part of a path pair including in the mapping of paths 218. To do so, the balance module 224 is operable to identify one or more unmatched paths of the first paths and/or the second paths. The balance module 224 then generates one or more artificial paths to form path pairs with the previously unmatched paths. In some instances, the artificial paths include duplicate paths. In additional or alternative examples, the artificial paths include a singularity such as a degenerate single anchor path.

Consider an example in which one of the first paths is an unmatched path. The balance module 224 is operable to determine whether or not there exists a second path that is a candidate for duplication. To do so, the balance module 224 computes morphing costs 208 to match the first path with each of the second paths in accordance with the techniques described above, even if the second path is already part of a path pair. If the morphing costs 208 to match the first path with a particular second path are below the z-score thresholds as described above (e.g., 1.7 for overall morphing cost and 1.8 for spatial cost 210, volumetric cost 212, and geometric cost 214) then the balance module 224 determines that the particular second path is a candidate for duplication. Accordingly, the balance module 224 is employed to duplicate the candidate second path to generate an artificial path to match with the first path. In an example with more than one candidate for duplication, the candidate with the least overall cost is selected for duplication.

In some instances, however, no candidate pairs exist that are below the z-score thresholds. Accordingly, the balance module 224 is operable to generate an artificial path that is a singularity, e.g., a degenerate single anchor path. Consider an example in which one of the first paths is an unmatched path. To generate the single anchor path to match with the first path, the balance module 224 determines the x-displacement and the y-displacement of the first path from the center of the first vector object 122. The balance module 224 then creates the single anchor path at an equivalent relative x-displacement and y-displacement from a center of the second vector object 124. This ensures minimum migration of the first path while blending. Further, the balance module 224 is operable to insert the single anchor path at a same z-order of the first path. The single anchor path does not have a visual effect on the second vector object 124, rather is defined by a single "invisible" anchor point. Thus, during subsequent blending the previously unmatched path appears as if it is "disappearing into" or "appearing out of" a digital canvas.

Generating a Transformed Vector Object

Upon balancing unmatched paths, the mapping of paths 218 includes low-cost path pairs for each of the first paths and each of the second paths. The transformation module 116 includes a morphing module 226 that is employed to generate the transformed vector object 118 by adjusting a property of at least one of the first paths based on the mapping (block 1008). In an example, the properties include one or more of a geometry (e.g., shape, orientation, size, etc.), appearance (e.g., color, gradient, fill, etc.), and/or z-order (e.g., overlap order of constituent entities) of the at least one first path.

To generate the transformed vector object 118, the morphing module 226 employs an interpolation module 228 that is operable to linearly interpolate one or more of the properties. In an example, the interpolation module 228 generates an interpolation axis, e.g., from zero to one, such that the transformed vector object 118 falls on the axis between zero and one. In this example, the closer the transformed vector object 118 is to one, the more the transformed vector object 118 looks like the second vector object 124 while closer to zero the transformed vector object 118 looks similar to the first vector object 122. Accordingly, at 0.5, the transformed vector object 118 is equally influenced by the first vector object 122 and the second vector object 124.

In some embodiments the transformed vector object 118 is based on a relative amount 230 of influence of the second vector object 124 on the first vector object 122. For instance, properties of the first vector object 122 are adjusted to an extent determined by the relative amount 230. In one example, the relative amount 230 is received as user input received via a user interface 110, for instance, as a specified amount of influence of the second vector object 124 on the first vector object 122. In another example, the relative amount 230 is determined automatically and without user intervention, for instance based on a preset level of influence.

By way of example, consider the continuums 416, 514, and 716 depicted in FIGS. 4, 5, and 7 that illustrate various levels of influence of the second vector object 124 on the first vector object 122. The continuums 416, 514, 716 demonstrate linear interpolation of geometry, appearance, and z-order based on various relative amounts 230 to generate transformed vector objects 118 that "look like" the first vector object 122 and/or the second vector object 124 to varying degrees. While in these examples transformed vector objects 118 are depicted as vector images, in some examples the techniques described herein are usable to generate one or more blending animations, videos, GIFs, SVGs, multi-state objects, etc.

To adjust the geometry of the at least one first path, the interpolation module 228 is operable to adjust a location of one or more control points (e.g., anchors and/or handles) of the first path based on the mapping of paths 218. The interpolation module 228 is also employed to adjust the appearance of the at least one path, for instance by gradationally editing fill and stroke operations applied to the first path, e.g., based on the relative amount 230. In some instances, the interpolation module 228 linearly interpolates the z-order, e.g., to adjust the z-order of the first path. However, in various examples the mapping module 216 generates the mapping of paths 218 regardless of z-order to minimize the cost of generating path pairs. For instance, a first path associated with a high z-order is matched with a second path with a low z-order. Thus, the first path "migrates" from high z-order to a lower z-order as part of blending. Because the first vector object 122 and second vector object 124 include a plurality of paths, this often results in z-order conflicts, i.e., z-order inversions. A naïve z-order migration scheme does not consider such conflicts, and thus a resultant transformed vector object 118 includes visual artifacts.

Accordingly, in various implementations the interpolation module 228 leverages a z-order crossfading scheme to control the z-order migration. Use of the z-order crossfading scheme enables the first paths to migrate to a targeted z-order, e.g., from a higher z-order to a lower z-order or vice versa while the geometry and appearance are interpolated in a two-dimensional plane. In an example, the interpolation module 228 calculates a table of z-order migrations to efficiently implement the z-order crossfading scheme, and thus conserve computational resources. The z-order crossfading scheme further utilizes fractional indexing to resolve z-order conflicts such as z-order inversions, e.g., when path pairs "cross" during z-order migration.

Fractional indexing allows the interpolation module 228 to generate fractional indices that represent "intermediate" z-orders. For instance, to resolve a z-order conflict between paths of 0th order and 1" order, the interpolation module 228 is operable to generate fractional indices between the 0th and 1" order, such as 0.5 z-order, 0.25 z-order, 0.125 z-order, etc. In this way, the interpolation module 228 resolves z-order conflicts and ensures proper z-order for each path pair during blending. The z-order crossfading scheme and implementation of fractional indexing further result in fewer migrations per path pair, and thus conserves computational resources in z-order interpolation.

FIG. 8 depicts an example 800 of advantages of z-order crossfading in a first stage 802, a second stage 804, and a third stage 806. In this example, as shown in the first stage 802, a first vector object 122 depicts a first plant 808 with drooping leaves in a large pot. A second vector object 124 depicts a second plant 810 with elliptic leaves in a relatively small pot. Second stage 404 depicts a continuum 812 that represents an attempt to blend the first plant 808 and the second plant 810 without utilizing the z-order crossfading scheme as described above. Consequently, vector objects included in the continuum 812 include visual artifacts and do not depict realistic intermediates. For instance, a vector object 814 depicts a vector object with multiple layer inconsistencies and a fragmented visual appearance.

In contrast, third stage 806 depicts a continuum 816 that represents blending the first plant 808 with the second plant 810 in accordance with the techniques described herein, for instance utilizing z-order crossfading. For instance, the interpolation module 228 leverages a z-order crossfading scheme to control the z-order interpolation. Accordingly, a subsequently generated transformed vector object 118, e.g., a third plant 818, is artifact free and is of superior visual quality when compared with the limitations depicted in second stage 804.

The morphing module 226 further includes a reassembly module 232. As described above, in some examples the first vector object 122 and second vector object 124 include a plurality of blendable hierarchies 204 that are processed individually. The reassembly module 232 is operable to reassemble the blendable hierarchies 204 to generate the transformed vector object 118 based on an original configuration of the blendable hierarchies 204 in the first vector object 122. Accordingly, the transformed vector object 118 includes paths that have been blended, (e.g., linearly interpolated) however retain the functionality, editability, and visual effects as defined by various path groups, e.g., simple groups, clipping groups, compound paths, etc.

FIG. 9 depicts an example 900 of a practical application of the techniques described herein in first stage 902 and second stage 904. In this example, a graphic designer has two mockups for a design however would like a representation that combines aspects of both designs. As depicted in first stage 902, a first logo 906 includes a circular design with mountains and a second logo 908 is a shield shape with no mountains, and a hammer graphic under the text. Using the techniques described herein, the transformation module 116 is operable to generate a variety of example logos based on the first logo 906 and the second logo 908, for instance by using the first logo 906 as the first vector object 122 and the second logo 908 as the second vector object 124. Accordingly, the user is presented with a variety of multi-state objects, i.e., transformed vector objects 118, that represent identifiable and practical intermediates that include visual characteristics of both the first logo 906 and the second logo 908. In this way, the techniques described herein overcome the limitations of conventional techniques by enabling creative customization of vector objects based on visual characteristics of multiple vector objects, while maintaining functionality of a mathematical representation associated with vector output.

Example System and Device

Figure 11:
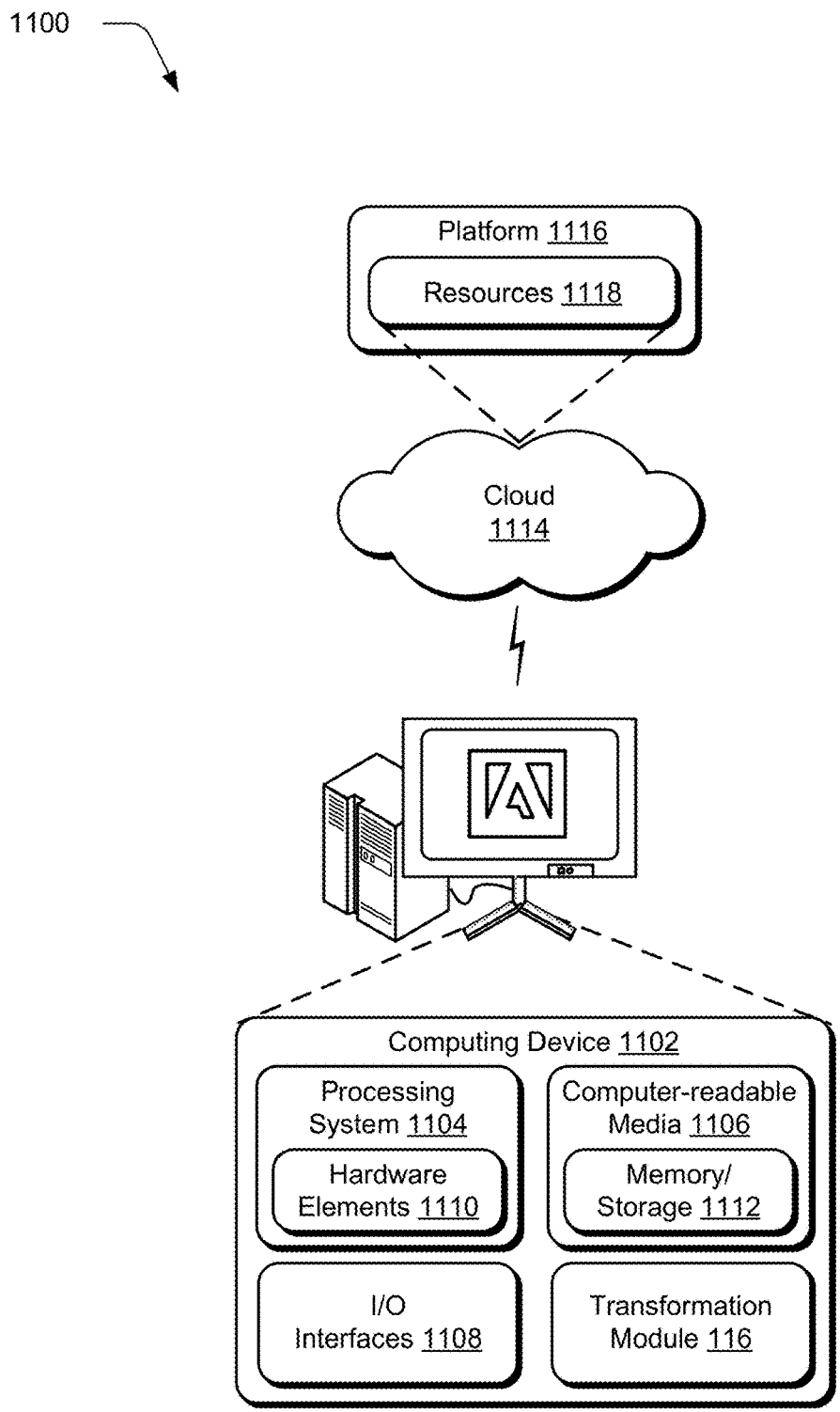
FIG. 11 illustrates an example system including various components of an example device that can be implemented as any type of computing device as described and/or utilized with reference to FIGS. 1-10 to implement embodiments of the techniques described herein.

FIG. 11 illustrates an example system generally at 1100 that includes an example computing device 1102 that is representative of one or more computing systems and/or devices that implement the various techniques described herein. This is illustrated through inclusion of the transformation module 116. The computing device 1102 is configurable, for example, as a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interface 1108 that are communicatively coupled, one to another. Although not shown, the computing device 1102 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware element 1110 that is configurable as processors, functional blocks, and so forth. This includes implementation in hardware as an application specific integrated circuit or other logic device formed using one or more semiconductors. The hardware elements 1110 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 1106 is illustrated as including memory/storage 1112. The memory/storage 1112 represents memory/storage capacity associated with one or more computer-readable media. The memory/storage 1112 includes volatile media (such as random access memory (RAM)) and/or nonvolatile media (such as read only memory (ROM), Flash memory, optical disks, magnetic disks, and so forth). The memory/storage 1112 includes fixed media (e.g., RAM, ROM, a fixed hard drive, and so on) as well as removable media (e.g., Flash memory, a removable hard drive, an optical disc, and so forth). The computer-readable media 1106 is configurable in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1102. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1102, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 1110. The computing device 1102 is configured to implement particular instructions and/or functions corresponding to the software and/or hardware modules. Accordingly, implementation of a module that is executable by the computing device 1102 as software is achieved at least partially in hardware, e.g., through use of computer-readable storage media and/or hardware elements 1110 of the processing system 1104. The instructions and/or functions are executable/operable by one or more articles of manufacture (for example, one or more computing devices 1102 and/or processing systems 1104) to implement techniques, modules, and examples described herein.

The techniques described herein are supported by various configurations of the computing device 1102 and are not limited to the specific examples of the techniques described herein. This functionality is also implementable all or in part through use of a distributed system, such as over a "cloud" 1114 via a platform 1116 as described below.

The cloud 1114 includes and/or is representative of a platform 1116 for resources 1118. The platform 1116 abstracts underlying functionality of hardware (e.g., servers) and software resources of the cloud 1114. The resources 1118 include applications and/or data that can be utilized while computer processing is executed on servers that are remote from the computing device 1102. Resources 1118 can also include services provided over the Internet and/or through a subscriber network, such as a cellular or Wi-Fi network.

The platform 1116 abstracts resources and functions to connect the computing device 1102 with other computing devices. The platform 1116 also serves to abstract scaling of resources to provide a corresponding level of scale to encountered demand for the resources 1118 that are implemented via the platform 1116. Accordingly, in an interconnected device embodiment, implementation of functionality described herein is distributable throughout the system 1100. For example, the functionality is implementable in part on the computing device 1102 as well as via the platform 1116 that abstracts the functionality of the cloud 1114.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
receiving, by a processing device, a plurality of first vector paths that define a visual representation of a first vector object and a plurality of second vector paths that define a visual representation of a second vector object;
computing, by the processing device, morphing costs that quantify a level of correspondence within candidate vector path pairs, each said candidate vector path pair including one of the first vector paths and one of the second vector paths, the morphing costs including a geometric cost between the first vector paths and the second vector paths of the candidate vector path pairs, the geometric cost determined using a neighborhood enriched dynamic time warping (DTW);
generating, by the processing device, a mapping of vector paths between the plurality of first vector paths and the plurality of second vector paths based on the morphing costs; and
generating, by the processing device for display in a user interface, a transformed vector object by adjusting a property of at least one of the first vector paths based on the mapping.

2. The method as described in claim 1, wherein generating the transformed vector object includes receiving a user input specifying a relative amount of influence of the second vector object on the first vector object.

3. The method as described in claim 1, wherein the morphing costs are further based on at least one of a spatial displacement within the candidate vector path pairs, or a volumetric proximity within the candidate vector path pairs.

4. The method as described in claim 1, wherein generating the mapping includes generating vector path pairs that include one of the first vector paths and one of the second vector paths using a Hungarian pairing algorithm to minimize cost of generating the vector path pairs.

5. The method as described in claim 1, wherein generating the mapping includes identifying unmatched vector paths for at least one of the first vector object or the second vector object, and generating artificial paths to match with the unmatched vector paths.

6. The method as described in claim 1, wherein generating the transformed vector object includes linearly interpolating at least one of a geometry, an appearance, or a z-order of one of the first vector paths based on the mapping.

7. The method as described in claim 6, wherein linearly interpolating the z-order includes employing a z-order crossfading scheme to control a z-order migration.

8. The method as described in claim 1, wherein the plurality of first vector paths and the plurality of second vector paths define at least one of a clipping group or a compound path.

9. The method as described in claim 1, wherein the neighborhood enriched dynamic time warping (DTW) includes enriching an input series with regional information to generate the geometric cost.

10. A system comprising:
a memory component; and
a processing device coupled to the memory component, the processing device to perform operations comprising:
receiving a plurality of first paths that define a visual representation of a first vector object and a plurality of second paths that define a visual representation of a second vector object;
computing morphing costs that quantify a correspondence between paths of candidate path pairs that include one of the first paths and one of the second paths, the morphing costs based in part on a geometric concurrence within the candidate path pairs, the geometric concurrence determined using a neighborhood enriched dynamic time warping (DTW);

generating a mapping between the plurality of first paths and the plurality of second paths based on the morphing costs; and generating a transformation of the first vector object for display in a user interface by adjusting properties of at least one of the first paths based on the mapping.

11. The system as described in claim 10, wherein the morphing costs are further based on at least one of a spatial displacement within the candidate path pairs, or a volumetric proximity within the candidate path pairs.

12. The system as described in claim 10, wherein generating the mapping includes generating path pairs that include one of the first paths and one of the second paths using a Hungarian pairing algorithm to minimize cost of generating the path pairs.

13. The system as described in claim 10, wherein the properties include at least one of geometry, appearance, or z-order.

14. The system as described in claim 10, wherein generating the mapping includes identifying an unmatched path in at least one of the first vector object or the second vector object, generating an artificial path based on the unmatched path, and generating a path pair including the unmatched path and the artificial path.

15. The system as described in claim 14, wherein the artificial path is a duplicate of one of the first paths or one of the second paths.

16. The system as described in claim 14, wherein the artificial path is a degenerate single anchor path.

17. A non-transitory computer-readable storage medium storing executable instructions, which when executed by a processing device, cause the processing device to perform operations including:

receiving input data that includes a plurality of first paths that define a visual representation of a first vector object and a plurality of second paths that define a visual representation of a second vector object;

generating a first blendable hierarchy from the first vector object that organizes the plurality of first paths by path groups and a corresponding second blendable hierarchy from the second vector object that organizes the plurality of second paths by path groups;

computing morphing costs that measure a level of correspondence within candidate path pairs that include one of the first paths from the first blendable hierarchy and one of the second paths from the second blendable hierarchy, the candidate path pairs based in part on path group, the morphing costs including a geometric cost determined using a neighborhood enriched dynamic time warping (DTW);

generating a mapping between the plurality of first paths and the plurality of second paths based on the morphing costs; and generating a transformed vector object for display in a user interface by adjusting a property of at least one of the first paths based on the mapping.

18. The non-transitory computer-readable storage medium as described in claim 17, wherein the path groups of the first blendable hierarchy and the second blendable hierarchy include at least one of a simple group, a compound path group, or a clipping group.

19. The non-transitory computer-readable storage medium as described in claim 17, wherein generating the transformed vector object includes reassembling the blendable hierarchies.

20. The non-transitory computer-readable storage medium as described in claim 17, wherein the morphing costs are further based on one or more of a spatial displacement within the candidate path pairs or a volumetric proximity within the candidate path pairs.

* * * * *